United States Patent
Meyer et al.

(10) Patent No.: US 7,254,765 B2
(45) Date of Patent: Aug. 7, 2007

(54) METHOD AND DEVICES FOR ERROR TOLERANT DATA TRANSMISSION, WHEREIN RETRANSMISSION OF ERRONEOUS DATA IS PERFORMED UP TO THE POINT WHERE THE REMAINING NUMBER OF ERRORS IS ACCEPTABLE

(75) Inventors: Michael Meyer, Aachen (DE); Reiner Ludwig, Hurtgenwald (DE); Stefan Wager, Esbo (FI); Joachim Sachs, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 162 days.

(21) Appl. No.: 10/525,498

(22) PCT Filed: Sep. 24, 2002

(86) PCT No.: PCT/EP02/10672

§ 371 (c)(1), (2), (4) Date: Feb. 23, 2005

(87) PCT Pub. No.: WO2004/030266

PCT Pub. Date: Apr. 8, 2004

(65) Prior Publication Data

US 2006/0168504 A1 Jul. 27, 2006

(51) Int. Cl.
*H04L 1/18* (2006.01)
*H03M 13/03* (2006.01)

(52) U.S. Cl. ...................... 714/748; 714/751

(58) Field of Classification Search ................ 714/748, 714/751
See application file for complete search history.

(56) References Cited

U.S. PATENT DOCUMENTS

| | | | |
|---|---|---|---|
| 6,145,108 A | 11/2000 | Ketseoglou | |
| 7,107,498 B1* | 9/2006 | Schmidt et al. | 714/704 |
| 2001/0052104 A1 | 12/2001 | Stark et al. | |
| 2003/0081692 A1* | 5/2003 | Kwan et al. | 375/295 |
| 2003/0126551 A1* | 7/2003 | Mantha et al. | 714/790 |
| 2003/0210668 A1* | 11/2003 | Malladi et al. | 370/335 |
| 2004/0025099 A1* | 2/2004 | Aikawa et al. | 714/748 |
| 2005/0226182 A1* | 10/2005 | Itoh | 370/329 |

OTHER PUBLICATIONS

European Patent Office, International Search Report for PCT/EP02/10672, dated Mar. 28, 2003.

* cited by examiner

*Primary Examiner*—R. Stephen Dildine
(74) *Attorney, Agent, or Firm*—Roger S. Burleigh

(57) ABSTRACT

A method and an apparatus for transmitting error-tolerant data is disclosed employing the ARQ technique, wherein the retransmission of erroneous data is performed up to the point where the remaining amount of errors is acceptable (for instance because the erorrs will not be perceived by the recipient of the information, which can be a person or a higher level protocol with additional error correction capabilities). The number of data blocks (RLC) detected as erroneous is employed to define a reliability measure (RM) and a request for retransmission of the erroneous data blocks is performed until a desired reliability threshold (RT) is reached. An additional threshold with a higher value than the first one can be employed to request for optional retransmission when the reliability measure (RM) is between the first and the second threshold. The retransmission will be performed only if further conditions such as channel availability are met.

11 Claims, 3 Drawing Sheets

METHOD AND DEVICES FOR ERROR TOLERANT DATA TRANSMISSION, WHEREIN RETRANSMISSION OF ERRONEOUS DATA IS PERFORMED UP TO THE POINT WHERE THE REMAINING NUMBER OF ERRORS IS ACCEPTABLE

TECHNICAL FIELD OF THE INVENTION

The present invention relates to a method for the transmission of data from a transmitter to a receiver, wherein the receiver performs a check whether received data is erroneous and wherein the transmitter performs a further data transmission according to said check.

BACKGROUND OF THE INVENTION

For the transmission of data from a transmitter to a receiver, it is customary to describe both the transmitter and the receiver as a hierarchy of protocol layers. For example, a hierarchy of layers may comprise, in addition to optional further layers, a physical layer, a link layer, a transport layer and an application layer. Each layer performs specific services in the transmission procedure for the next higher layer while the processing within and below said layer is hidden for higher layers. In this way, design and description of the transmitting entities and protocols can be simplified.

In most cases, the data for transmission is divided into a plurality of data packets, which are passed through the hierarchy of protocol layers. During this processing, check sums for error detection or packet headers may be added to the packets or removed from them in the layers. Data packets can also be segmented, padded, interleaved or concatenated according to the requirements of the particular layers. The corresponding data packets generally have different names, such as protocol data unit (PDU), service data unit (SDU), packet, frame, cell, segment etc., depending on the specific protocol or technology involved. In the present specification, the term data packet generically relates to any of such data packets, a PDU denotes a data packet of the protocol layer under consideration while an SDU denotes a data packet passed to the next higher layer in the protocol stack.

During transmission, errors may occur in the transmitted data, e.g., a data packet may be totally lost or bit errors can occur within a data packet or data stream. Especially for transmission protocols on links with a high probability of data errors, like wireless links, methods are applied in the state of the art to detect and correct such errors. In forward error correction (FEC), redundant data is transmitted which allows the correction of erroneous data by the receiver.

In ARQ (Automatic Repeat Request) protocols, erroneous data, i.e. data comprising transmission errors or lost data, is detected by the receiver and retransmitted according to a corresponding request sent by the receiver to the transmitter. Original packets and retransmissions can be identical but they can also differ, e.g. the original data and the retransmission may be coded differently or they may supplement each other like in retransmission schemes with incremental redundancy. It is also possible, that a retransmission is detected as erroneous due to loss or bit errors and selected for a further retransmission. To allow an identification of erroneous data, the data is generally transmitted in data packets comprising sequence numbers and/or check sums. With increasing probability of transmission errors, the error handling of the protocol determines the transmission efficiency to a significant extent.

As an example, the RLC (Radio Link Control) link layer according to 3GPP specifications allows a high transmission efficiency by operating radio bearers in acknowledged mode ensuring data reliability with an ARQ protocol. This is especially suitable for applications, which do not require strict delay bounds for the data and can tolerate additional delays introduced by the retransmissions. A highly efficient transmission configuration in this case allows a certain number of transmission errors, which avoids overprotection of the information by much FEC or excessive transmission power.

In data communications, applications and protocols are getting increasingly important which are able to cope with a certain amount of errors, e.g. by performing error correction, error detection, by applying error concealment techniques or any combination of such methods. Error tolerant applications are for example customary for video, audio or speech transmission. However, present transport protocols in the Internet, like TCP (Transport Control Protocol) or UDP (User Datagram Protocol) are not adapted to error-tolerant applications. TCP is suited especially for applications, which require error free transmission without strict delay-bounds. UDP can discard erroneous data packets but does not guarantee reliable data transmission and is used for example for streaming applications with delay requirements. For the transmission of data to error-tolerant applications within the Internet, the UDP Lite protocol has been proposed as a further Internet Standard. The UDP Lite protocol does not automatically discard data packets, in which transmission errors are detected but can forward them to the application, which can in turn apply an error correction or concealment on the application layer. However, no automatic repeat request protocol exists, which is suited for error tolerant applications. Therefore, the transmission efficiency remains limited and the advantages of error-tolerant applications and protocols can at most partly be exploited.

SUMMARY AND DESCRIPTION OF THE INVENTION

It is an object of the present invention to obviate the above disadvantages and provide a method for an effective data transmission in a protocol allowing transmission errors.

In the proposed method, a receiving protocol layer receives data from a transmitter via a transmission link and a reliability measure is determined for the received data. Preferably, the reliability measure is determined for a defined range of received data. If the data is transmitted in data packets, the range of received data can be a data packet, one or more selected parts of a data packet or a group of data packets, e.g. a predefined number of consecutive packets. A data packet can be for example a protocol data unit, an SDU contained in parts of one or more protocol data units or any higher layer protocol data unit, e.g. an ADU (Application Data Unit) contained in parts of one or more protocol data units.

The reliability measure indicates whether received data comprises errors. It can indicate for example the occurrence of errors in a range of data, the probability of errors in the data or a fraction of errors in the data. Reliability measures can be obtained either by the protocol layer performing the method or by another layer in the protocol stack, e.g. by the physical layer. Examples of suitable reliability measures are a measured signal to interference ratio, information from the channel decoder like path weights, information from checks for error detection like a number of erroneous protocol data units per SDU or ADU or a number of erroneous data packets within a certain time interval. The reliability measure can also relate to individual bits or bit error percentages in the data. Any combination of such reliability measures can be used.

In a subsequent comparison, the reliability measure is compared to a reliability threshold relating to the level of acceptable errors in the data. The reliability threshold can differ for different parts of the transmitted data. At least for one part of the data, the level of acceptable errors is higher than zero and the reliability threshold is below the value corresponding to error-free data. According to the result of the comparison, a decision is performed whether a data packet is retransmitted. It is preferable, to select data for retransmission, which is detected in a check as erroneous. Alternatively, especially if the reliability measure indicates an error probability like a signal to interference ratio, retransmissions can be performed without a check which packets are erroneous. In the latter case, packets can be selected for retransmission in a defined sequence or statistically. If the received data is sufficiently reliable, i.e. if the reliability threshold is at least reached, retransmissions are either not performed or they are only performed according to further conditions.

The described method allows an effective transmission of data suffering transmission errors, especially for a protocol transporting data of an error-tolerant application or an error-tolerant higher protocol layer. It is suited to all types of error resilient applications, especially streaming. The use of transmission resources, especially network resources and radio resources, can be significantly reduced. Local resources in the transmitter or receiver can also be saved, e.g. memory or battery consumption. The method can enhance the quality of service both for the considered transmission or user as well as for further users of a communication system who can use the additional resources. Transmission delays and—in case of in-sequence delivery of packets—bursts of released data are reduced, since transmitted data can be passed to the next entity or layer when it is has reached a sufficient quality. The method is applicable on different protocol layers of a transmission system, e.g. on a link layer or a transport layer, and in different types of communication systems, for example in a GSM or UMTS or CDMA 2000 communication system or in a WLAN system. The method can also be used in hybrid ARQ transmission schemes, in which redundant data sent with the original data or with the retransmission allows a correction of errors from the redundancies and the retransmitted data.

In an advantageous embodiment, the further data transmissions are performed for data, which is detected in a check as erroneous. In this way, existing ARQ protocols can be easily adapted to the proposed method.

Generally, it is possible that the reliability measure or the result of the comparison is transmitted between receiver and transmitter and either of the entities may perform the decision whether a retransmission is executed. In a preferred embodiment, the receiver requests the retransmissions according to the comparison. In this way, the signaling between transmitter and receiver is minimized.

Typically, a data packet comprises a header part and part for the payload data. Errors in the payload data part can often be corrected, concealed or ignored while errors in a protocol header may cause a malfunctioning of the protocol. Also within the payload, different parts of a packet may have different relevance for the quality level, like for example in customary video and audio codecs. Parts of the payload can also differ in relevance for other layers of the protocol stack, e.g. if the header of one protocol is a payload in an underlying protocol layer. If it is possible to detect in which part of the data an error occurs, for example by attributing a check sum to an individual part, a reliability measure can be determined for the individual part and compared to a corresponding threshold. This gives the advantageous opportunity to handle parts of the data with different relevance differently and select only valuable data packets for retransmission while skipping retransmissions of other corrupted parts. Data with an error in a sensitive part of said data or of a higher protocol layer can be requested for retransmission with high persistence while higher error rates can be allowed in less sensitive parts of the received data.

One or more further conditions can determine whether a retransmission of a data packet is performed. The further condition can be checked in a further comparison, in which the same or a different reliability measure is compared to a further threshold. The further condition can, e.g., check whether a retransmission increases the quality of service for the application from a first to a second predefined level. In order to ensure a certain quality of service, a further condition can also be a comparison of resources required for retransmission to a specific threshold, e.g. for the amount of radio resources required for a retransmission. Retransmissions may, e.g. by delaying other data, affect the quality of service both for the transmission under consideration and for other users in a communication system. Further conditions determining the quality of service may also be considered, e.g. a threshold for the time a data packet is already stored for transmission or a delay budget remaining for transmission. Also the use of local resources in the transmitter or receiver, like memory or battery consumption, may be checked in the further condition. Any combination of the above conditions is possible. This allows for example to chose the reliability level according to available resources.

If a second reliability threshold is defined, i.e. if two or more reliability thresholds exist, it is possible to perform a decision to continue retransmissions until a selected one of the at least two thresholds is achieved. In this way, different levels of transmission quality can be selected. The decision can be based on any further condition as described in the preceding paragraph.

A transmitter for an ARQ protocol in the state of the art generally receives information about lost data packets, while this is not the case for the present method after the reliability threshold is reached. Optionally, the receiver sends therefore a reliability information to the transmitter, for example included in a retransmission request message or in a separate message. The reliability information indicates an error level, i.e. the transmission quality, and can be the reliability measure or information calculated from reliability measures. In this way, the transmitter can adjust operating parameters according to the reliability information.

The information whether a retransmission is advantageous for one or several users of a communication system is in many cases available at the transmitter. It can for example be derived from the content for transmission or operational parameters of the communication system. To allow the decision by the transmitter whether a retransmission is performed, an optional retransmission request can be defined in addition to mandatory retransmission requests. Optional and mandatory retransmission requests can be different types messages or they can be distinguished by an option field in a message. An optional retransmission request is sent if the reliability measure is at least equal to the reliability threshold, i.e. a selected one of the thresholds in case that more than one threshold is defined. For an optional retransmission request, a value of importance for all or specific retransmissions can be indicated by the receiver with the request or it may be determined from information present at the transmitter. Compared to a mandatory retransmission request, the transmitter performs at least one further decision, whether a retransmission is performed in reply to the optional retransmission request. The result of the decision as well as the value of importance for retransmissions can be determined for example according to a reliability measure and/or a reliability threshold, the resources required for retransmission, conditions determining the quality of service like a delay budget remaining for transmission or any combination of these.

In a further advantageous embodiment, the transmitter can send a reliability requirement to the receiver. The reliability requirement relates to the significance of data packets, e.g. a PDU, SDU or ADU, parts or groups of them and can be used to select the reliability threshold. The reliability requirement can be included in a header field of a protocol data unit or it may be separate message. In this way, the flexibility of the method is improved compared to pre-configured thresholds. For example, the thresholds may be adapted according to the total loading of the communication system by the users.

If partly erroneous data is transmitted, the further problem occurs that higher protocol layers and the application in the receiver are oblivious of the reliability of the received data. To improve the data processing, it is advantageous to provide the reliability measure to a higher protocol layer or application and adapt the processing of said layer or application according to the reliability measure. The application or higher protocol layer can use the information in improved error concealment methods, e.g. by applying different data handling or error concealment algorithms according to the data reliability. For example, an application can perform a decision according to the reliability information whether error correction or error concealment need to be performed or whether errors can be ignored.

A receiver according to the invention receives data sent by a transmitter and forwards it for further processing to a further layer in a protocol stack or to an application. The receiver has a receiving unit for the data, generally data packets. The receiving unit decodes the received data and forwards it to a processing system, which performs a check whether data is erroneous. For example, the receiver can detect missing data packets discarded in the receiving unit due to an error from a missing sequence number. Bit errors in a data packet can be detected from a cyclic redundancy check (CRC). A transmission unit in the receiver, generally integrated with the receiving unit, is adapted to send a request to the transmitter for a further transmission of data according to the check, especially of the data being detected as erroneous.

The processing system comprises a unit for determining a reliability measure for the received data, e.g. from one of the above checks. A reliability measure can also be obtained from the receiving unit, e.g. a signal-to-interference ratio. Furthermore, the processing system comprises a unit for a comparison of the reliability measure to a reliability threshold. The processing system is adapted to initiate the request for the retransmission of the data according to the result of the comparison, e.g. of data packets detected to be erroneous. For this purpose, the processing system can perform a decision whether a retransmission is requested or whether the request is mandatory or optional. The units in the processing system can be implemented as software code and they can perform any embodiments of the above method.

If the above method is implemented exclusively in the receiver, a transmitter as known in the state of the art can be used in the method. A corresponding transmitter has a transmission unit for sending data to a receiver and a receiving unit for receiving requests from the receiver for a further transmission of previously sent data. Typically, both units are part of a transceiver. A processing system stores the sent data in a memory, retrieves stored data according to the requests and initiates a retransmission of the retrieved data by the transmission unit.

It is often advantageous to perform all or some steps of the method in the transmitter. In this case, the transmitter comprises, in addition to the described units, a processing-system with a unit for determining a reliability measure for the received data, for example by measurements or by extracting the information from a message sent by the receiver. The processing system comprises a unit for a comparison of the reliability measure to a reliability threshold and it is adapted to initiate retransmissions of the indicated data packets according to the result of the comparison. The units in the processing system may be for example implemented as software code. They can perform any embodiments of the above method.

If a transmitter receives an optional retransmission request, the retransmission decision can be based on the importance of a retransmission for a service. The importance can be indicated in the request message or it can be determined by the transmitter, e.g. if a PDU contains a header of a higher protocol layer. Furthermore, resources presently available, the load and requirements of other services, transmitter operating conditions like the queue fill state for radio links, the data rate currently available or the time data packets have already spent in transmitter memories, buffers and queues or any combination of these conditions can be considered.

A program unit according to the invention controls the transmission of data from a transmitter to a receiver. The program unit implements a protocol, in which the receiver performs a check whether received data is erroneous and wherein the transmitter performs a further transmission of data according to the check. The program unit comprises software code for performing the steps of obtaining a reliability measure for the received data, performing a comparison of the reliability measure to a reliability threshold, and initiating the further data transmissions according to the result of the comparison. The program unit is for example stored on a data carrier or loadable into a transmitter or receiver, e.g. as a sequence of signals. It may be part of a software packet comprising further software components, e.g. a processing system. The program unit can be used in any embodiments of the above method.

The foregoing and other objects, features and advantages of the present invention will become more apparent in the following detailed description of preferred embodiments as illustrated in the accompanying drawings.

BRIEF DESCRIPTION OF THE DRAWINGS

FIG. 4b shows an example of a data packet comprising the reliability information of FIG. 4a.

DETAILED DESCRIPTION OF PREFERRED EMBODIMENTS OF THE INVENTION

Figure 1A:
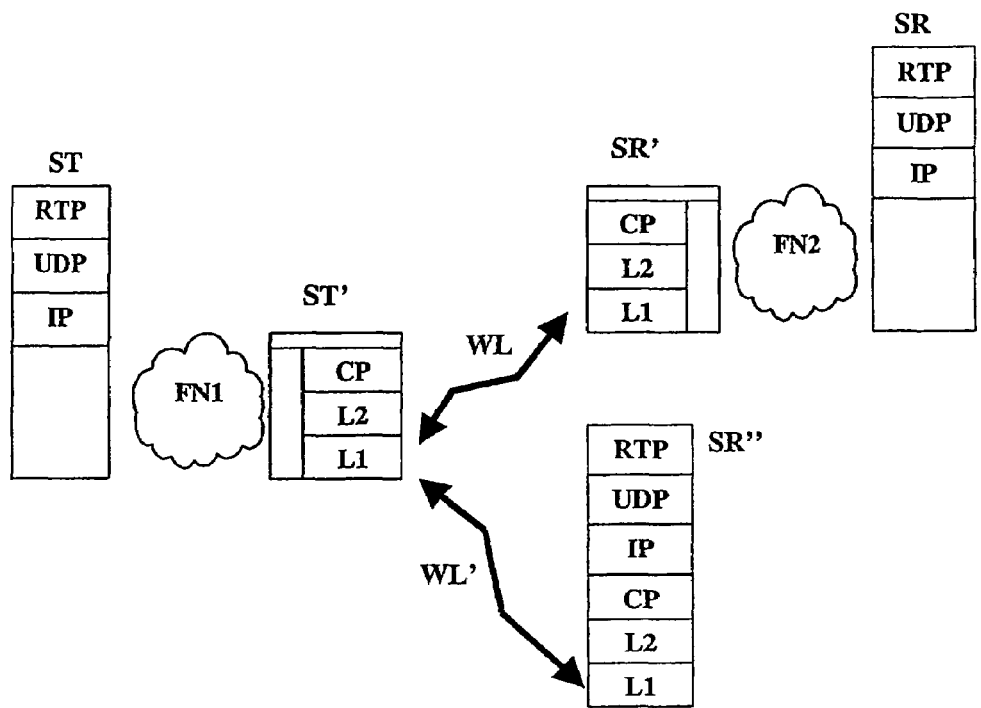
FIG. 1a shows a data transmission over a connection including an unreliable link.

In FIG. 1a, a data transmission is shown from a transmitter ST to a receiver SR with the corresponding protocol layers. The connection is performed over different networks FN1, FN2 and includes an unreliable link WL between an optional intermediate receiver SR' and an optional intermediate transmitter ST'. In FIG. 1a, different entities are the transmitters and receivers for different protocol layers on the wireless link WL, i.e. for the three lower layers the intermediate receiver SR' and intermediate transmitter ST' are the entities involved while higher layers are only processed in transmitter ST and receiver SR. Networks FN1, FN2 are optional entities and it is customary, e.g. for a mobile phone, that all protocol layers are integrated in a single device SR'' connected to the intermediate transmitter ST' over a wireless link WL'. However, a Bluetooth network, infrared links or another ad hoc network FN2 may connect different user devices, e.g. laptop, mobile phone or personal digital assistant (PDA).

Every transmitter ST, ST' receives service data units (SDU) from a higher protocol layer or from an interworking function and transmits them in one or more protocol data units (PDU) to the corresponding protocol layer of the receiver SR, SR', SR''. In the example, the protocol stack comprises a physical layer L1, a link layer L2, a convergence protocol CP for the wireless link WL, the Internet Protocol IP, the User Datagram Protocol UDP and the Real Time Protocol RTP, which receives the data from the application at the transmitter ST and forwards it to the application at the receiver SR, SR''.

Figure 1B:
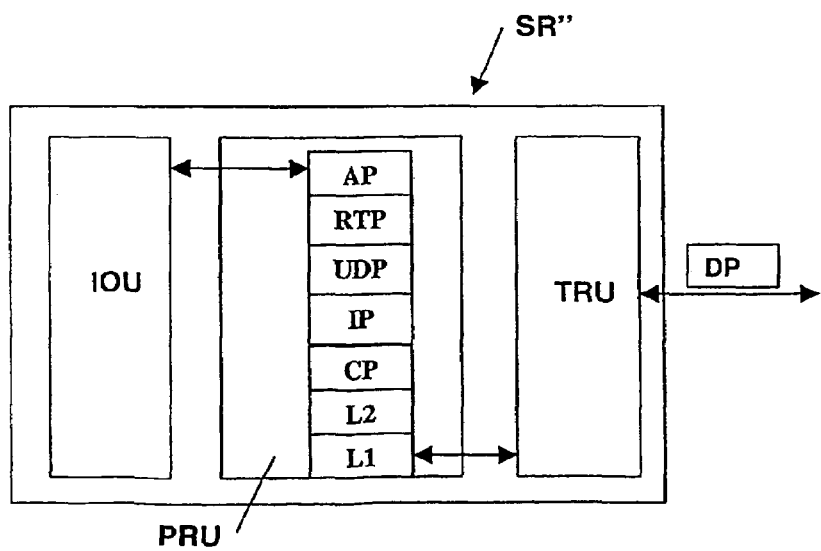
FIG. 1b shows a receiver for the transmission.

FIG. 1b shows a receiver SR'' for the transmitted data. A transceiver unit TRU allows the encoding of data for transmission and the sending of data to other devices as well as for the reception and decoding of data. Generally, data DP is sent in data packets. The protocol stack is implemented in a processing system PRU providing the required processing and storing functionality for executing the data processing. The data is forwarded between the transceiver unit TRU and the lowest layer L1 in the protocol stack. Corresponding functionality is also implemented in all other entities depicted in FIG. 1a, i.e. all receivers SR, SR', SR'' and transmitters ST, ST'. In addition, the final receiver SR, SR'' has an input and output unit IOU, e.g. with a keyboard, loudspeakers and a display, for the presentation of data to a user and for receiving user commands. Often, an input and output unit IOU has also a processing and storing unit with a memory or hard disk. The protocol stack has an application layer AP for exchanging. data with the input and output unit IOU.

At least one protocol layer in one of the receivers SR, SR', SR'' checks the received data packets for errors or missing packets and requests retransmissions from the corresponding protocol layer in the transmitter ST, ST'. This protocol is denoted ARQ protocol although there may be several layers in the protocol stack with an ARQ mechanism. According to the requests, the transmitter retransmits previously transmitted data packets.

The proposed ARQ protocol is adapted to the requirements of error-tolerant applications. For example, a client application executed in receiver SR can request to receive data with a defined level of reliability. The requested level of reliability is for example the minimum level of correctly received data required to process the data or it may correspond to a required output quality of the application. Data is transmitted over links in the networks FN1, FN2 including wireless link WL, which may all introduce errors into the transmitted data, e.g. if packets are dropped due to congestion in a network FN1, FN2 or due to a transmission error on the wireless link WL.

To recover from the errors, the ARQ protocol applies the proposed method. If several ARQ protocols are present, it is possible that several protocol layers perform the proposed method, e.g. both the transport layer and the link layer. The level of reliability requested by the application is mapped to a reliability threshold at the protocol layer applying the proposed method. The reliability threshold corresponds to the acceptable level of errors and is below the value corresponding to error-free data, e.g. below 100% if the reliability threshold represents the required fraction of correct data. If several protocol layers perform the method, the thresholds may differ for the layers.

In contrast to the state-of-the art, the proposed protocol ARQ does not recover from all transmission errors, i.e. retransmission requests are not sent until all data is transmitted successfully. Rather, requests of retransmissions for erroneous data are only sent until the received data has reached the defined reliability threshold. Even if data packets are still erroneous and there is enough time for retransmissions, no further retransmissions are performed after the reliability threshold is reached.

Streaming technology allows a nearly instantaneous access for the users to pre-stored content without the necessity to transfer a complete file before presentation. Streaming applications, e.g. for video or audio files, can often perform a concealment of bit errors to a certain extent. On the application layer, forward error correction can be applied alternatively or in addition to ARQ methods, i.e. the application layer can correct bit errors from redundant information. Furthermore, an application may tolerate bit errors, like many voice codecs for speech transmission, e.g. the Adaptive Multirate Codec (AMR).

However, streaming applications have transfer delay requirements on the communication path, which need to be fulfilled in order to achieve a required quality. Data packets arriving after the delay limit are dropped because the processing of the corresponding information must be finished before the presentation time to the user. As retransmissions for correcting errors introduce delays, ARQ protocols can only be applied if the delay requirements are not too tight. If both delay and quality requirements exist, a suitable level of both errors and delay is required.

The proposed method is especially advantageous for a streaming service over a radio bearer of a communications system using an ARQ protocol. If the streaming is performed from a server connected to the communication system, the intermediate transmitter ST' is for example a radio base station (RBS) or a radio network controller (RNC), depending on the ARQ layer in the protocol stack, while the receiver SR'' can be a user equipment. It is, however, also possible to perform a streaming in the up-link with the user equipment as transmitter and the RBS or RNC as receiver.

Figure 2:
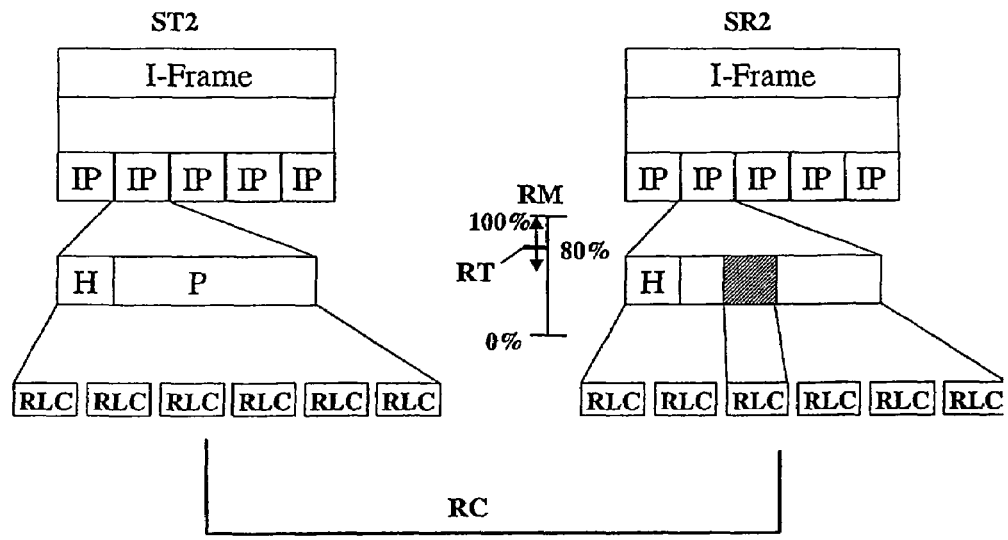
FIG. 2 shows a transmission of data packets from a transmitter to a receiver according to the invention.

The processing of data packets for transmission is shown in more detail in FIG. 2, depicting only selected layers of the protocol stack for simplicity. A video stream can comprise different types of frames, including information being part of an image or information about changes between consecutive images. One example is an I-frame of a video stream, which can be larger than an IP (Internet Protocol) packet. If the transmitter ST2 forwards the I-frame from the application layer of the protocol stack to the IP layer, it is therefore divided into several IP packets, each having a header part H and a payload part P. When the IP packets are processed for further transmission by the link layer L2, an IP packet does generally not fit into one data block RLC, which is the link layer PDU of a UMTS communication system. Therefore, a further segmentation is performed on the link layer L2.

The packets are then forwarded to the physical layer L1 for transmission over the radio connection RC to the receiver SR2. The receiver SR2 performs a reverse processing for all layers to assemble application I-frames from the RLC packets by removing header parts H and concatenating the payload parts P. The RLC packets comprise also a control information part, which allows to perform a check whether bit errors occurred on the radio connection RC.

In the example, the application can tolerate up to 20% bit errors, i.e. it needs 80% correct bits in the payload to process the information. In a resource-efficient transmission the ARQ process can be stopped if this threshold is passed. Existing ARQ protocols retransmit every data block until a delay budget for the data block is expired or a maximum number of retransmissions has been reached. In the proposed method, resource utilization is improved by stopping the retransmission process for data, which is sufficiently error-free. The required level is preferably determined by the application because the error level, which can be tolerated, may vary considerably for different types of applications, like audio or video, or for different processing methods, e.g. if error concealment can be performed or if redundant information allows error correction. Resources, which are not needed for retransmission, can be used to transmit new data for the same user or they may be attributed to other users.

A reliability measure RM is defined to check whether the received data has a sufficiently low error level. The reliability measure RM is preferably selected to indicate whether an erroneous data segment can still be processed. For example, a fatal error in a sensitive part can require that a packet needs to be totally dropped, e.g. if a bit error destroys the packet sequence number. Errors in less sensitive information can still allow a processing. If an error can be fatal, it is sufficient if the reliability measure indicates whether a data unit is error free or comprises an error. The reliability measure for data units, which can be processed in case of errors, preferably indicates the error level. The reliability measure for every data unit can be determined for example from decoding information provided by the physical layer or from error-detecting codes of the protocol. The reliability measure is then compiled for all data units in a data segment under consideration and the aggregated reliability measure for the segment is compared with a reliability threshold. Retransmissions are requested until the threshold is reached.

Information about packets of higher layers can be used for the definition of a suitable reliability measure or the selection of an appropriate threshold. For example the IP headers must be correct to allow the processing of IP packets. Otherwise, the IP packet is dropped. Therefore, a further check preferably determines whether the information reassembled from the data blocks RLC results in a valid IP packet with intact header and a correct packet size. The IP header comprises a CRC field as well as a field indicating the packet size. The CRC can be used to check whether the header is intact. A check of the packet size is advantageous if concatenation is used on a lower layer, i.e. if a PDU of the lower layer can contain parts of two IP packets. In this case, the framing of the IP packet is ambiguous if the boundary between the IP packets cannot be determined. If a complete lower layer data packet is missing, the length information of the IP packet can be used to pad the missing payload part.

In the simple embodiment of FIG. 2, the fraction of error-free data blocks RLC is counted for each IP packet on the RLC protocol layer. The reliability measure RM is therefore the fraction of error free data blocks RLC in an IP packet. If at least 80% of the data blocks RLC in an IP packet are error free, retransmission requests for data blocks RLC in this IP packet are stopped. Preferably, data blocks RLC comprising parts of the IP header H are treated differently because the whole IP packet is dropped in case of an erroneous header. The corresponding data blocks RLC are preferably retransmitted until they are correctly received or until their delay budget expires.

Alternatively, the reliability measure RM can be determined on bit level, e.g. as a percentage of bit errors in a data packet or bit error positions can be indicated. Detailed information about errors is especially advantageous if the reliability measure is evaluated within the entity in which it is determined and the transmission overhead for detailed information is acceptable, e.g. due to transmission on an internal data bus.

Defining more than one level of reliability can further enhance the method. For example, the quality of service may be improved if the received data is of reliability level B, which is higher than a minimum level A required for processing. In this case, the transmitter or the receiver can continue to initiate retransmissions for error recovery beyond reliability level A up to reliability level B. The decision whether to perform retransmissions until achieving either reliability level can be based on a single or several parameters from a group comprising service requirements, e.g. a remaining delay budget, prioritization, e.g. selected services or users, radio resource availability and costs.

In some protocols, transmitter and receiver windows are used to track erroneous or unacknowledged data packets. If the receiver receives a data packet outside the receiver window, the packet is discarded while the transmitter performs only retransmissions of packets within the transmitter window. Else malfunctions of the protocol may occur, especially if cyclic numbering schemes are used for the data packets.

The above method can also be used together with transmitter and receiver windows. Especially, it is possible to advance the receiver window if the required reliability for the data packets is achieved. To accommodate optional retransmissions, a further section of the receiver window may be defined below the receiver window. The further section can be moved if no retransmissions are received within a certain time, e.g. within a round trip time of the protocol. The transmitter window can be moved after a decision to send no further retransmissions for selected data. A message from the transmitter to the receiver initiates a corresponding move the receiver window, e.g. according to the procedure "Move Receiver Window" as defined in the 3GPP specifications.

In the proposed method, the selection of the reliability threshold ensures the provision of data with a sufficient quality level to the application while allowing a highly effective transmission. For an appropriate definition of the threshold, it is necessary to provide the reliability requirements of the application or a higher protocol layer to the ARQ protocol. Both for the source and the means of providing the reliability requirements, a plurality of options exists. Information determining the reliability thresholds can for example be pre-configured or it is provided by the application, the user or a further protocol.

Information defining the reliability requirements can for example be signaled in a further protocol like a reservation protocol, e.g. in an extension to the RSVP (Resource Reservation Protocol). Reliability requirements can also be provided or negotiated during the setup of a connection. For a transport protocol, reliability requirements can be options negotiated at the socket interface. For a radio link protocol they can be included in a radio bearer establishment request, either from the client terminal or from the network. A pre-configured reliability requirement can be stored as a profile. Reliability requirements can also be determined from the transmitted data, e.g. according to the type of transported media which can be determined from the protocol headers. For example, if the UDP Lite protocol transports the RTP (real-time protocol) with a specific RTP format, i.e. media type, a certain reliability requirement can be pre-configured for this combination. Reliability requirements can also be signaled in the transmitted data, e.g. as an option field in packet headers. Combinations of these options are possible, especially if several thresholds are used.

In a further improvement of the method, reliability information is provided to the application or a further protocol layer. For this purpose, functionality is required to pass reliability information in an effective way along with the information that is transmitted. Reliability information is in particular available at the receiving side of the ARQ protocol although any reliability information gathered along the path through the network can be used. The reliability information can be used for example in error concealment or correction procedures. Although the use and forwarding of reliability information is described here with respect to a method for performing retransmissions, it should be noted that the use and forwarding of reliability information as described is a general principle which can also be used for a protocol without retransmissions or for a protocol performing retransmissions differently from the proposed method.

Figure 3:
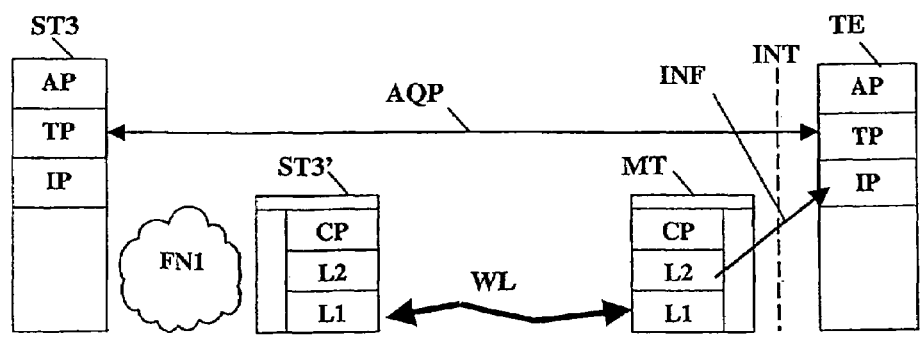
FIG. 3 shows the forwarding of reliability information between different protocol entities

Within a single protocol stack, forwarding of reliability information can be performed by well-known procedures, e.g. by primitives sent between the layers or by using shared memories. However, often reliability information has to be forwarded to a different protocol entity as depicted in FIG. 3. Transmitters ST3, ST3' comprise protocol layers as described with respect to FIG. 1, except that a generic transport protocol TP and an application layer AP are indicated in the protocol stack. The receiver consists of a mobile terminal MT connected over a standard interface INT to a terminal equipment TE. Mobile terminal MT and terminal equipment TE may be implemented in the same hardware e.g. in a multimedia mobile phone, or in separate hardware units, e.g. in a laptop connected to a mobile phone over a cable or a Bluetooth-link. On the wireless link WL, packet losses may occur on the link layer L2, e.g. due to a transmission without acknowledgements or due to packets dropped after excessive delays in an acknowledged transmission scheme. The protocol AQP performing retransmissions according to the proposed method is in this case the transport layer TP in the terminal equipment while the reliability information is available on the link layer L2 in the mobile terminal MT.

For the forwarding of reliability information INF between logically or physically separate protocol entities, several alternatives exist. As the forwarding within a protocol stack is straightforward, it is possible that another layer than the protocol AQP performing retransmissions receives the forwarded reliability information INF in the receiving entity. For example, in FIG. 3 the layer IP in the terminal equipment TE receives the reliability information INF and forwards it to the protocol AQP.

Figure 4A:
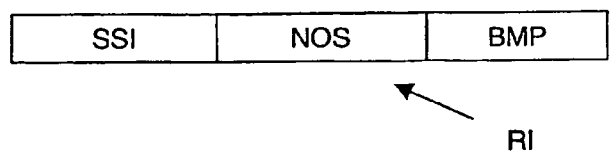
FIG. 4a shows an advantageous format for a reliability information

An example for an advantageous format of reliability information RI is shown in FIG. 4a. A field SSI specifies the segment size, i.e. the granularity, for which reliability information is available. A field NOS indicates the number of segments to which the reliability information relates. A bitmap BMP represents the reliability of each segment, wherein one or more bits can relate to each segment. If a protocol allows segments of various lengths, a list indicating the size and reliability of each segment is an advantageous alternative to the embodiment shown. The granularity of reliability information can vary. Reliability information for every bit can be obtained from the channel decoder on the physical layer but results in a large amount of information. Information for layer 2 protocol data units, e.g. per RLC protocol data unit in GPRS (General Packet Radio Service) or UMTS systems, is an advantageous option and can be obtained from the CRC check at the link layer receiver. In both cases, an application can identify error probabilities for different parts of the received data.

Figure 4B:
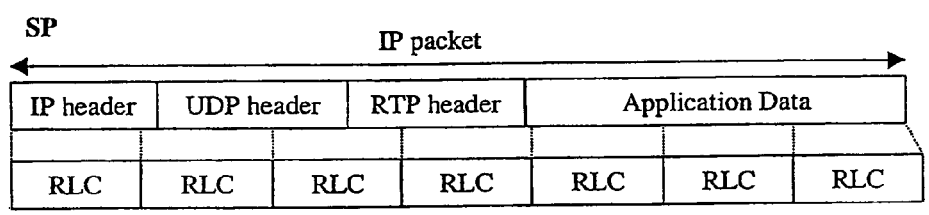
Figure 4B:
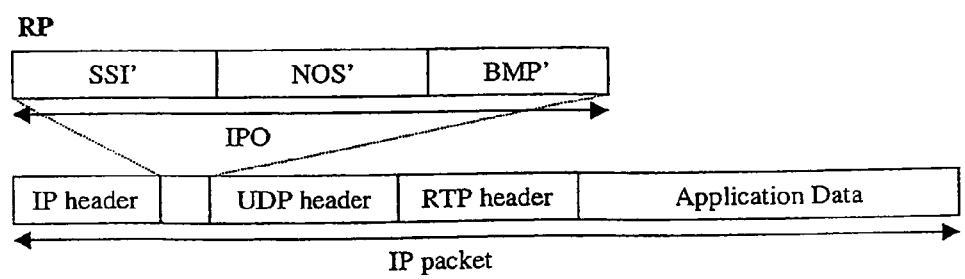

The reliability information can be passed to the application as header field of a higher layer protocol data unit. FIG. 4b depicts the use of the general format as defined with respect to FIG. 4a in an IP packet. The IP packet comprises the headers of several higher protocol layers as well as application data and is sent from a sending protocol entity SP to a receiving entity RP. For this purpose, the IP packet is divided into a plurality of segments RLC corresponding to link layer protocol data units and reassembled from them at the receiving entity RP. The reliability information is indicated in an optional field of the IP header, which is amended during assembly. In this case, the field SSI' corresponds to the size of the link layer PDU, the field NOS' to the number of PDUs in an IP packet and the field BMP' represents the reliability information for each PDU as entry in a bitmap. The application at the receiver extracts the optional field. An implementation of this alternative requires an extension of IP socket features to allow the amendment of the reliability information. Advantageously, this alternative can be used together with the encryption of IPsec (secure Internet Protocol), because the IP header is not encrypted and can therefore be amended by lower protocol layers.

Alternatively, reliability information can be appended to the application protocol data unit ADU. Due to the encryption of IPsec, this alternative is not suitable for IPsec. Applications, which are not adapted to the additional information, can misinterpret the received data. Therefore, the sender preferably triggers the appending of reliability information to ADUs. One option for a UDP flow is an initial UDP message from the sender to the receiver on a specific port number, the message indicating the flow identity. The receiver monitors all UDP packets and identifies the initial UDP message by the port number. The receiver then adds reliability information to UDP packets in the flow with the indicated identity. If the application data is transmitted in ADUs having a header, the information can be a header field of the ADUs, e.g. in the format depicted in FIG. 4a. Alternatively it is included in the payload.

In a further alternative, the receiving protocol entity can generate a message to the receiving terminal. The message comprises the reliability information for a data flow and can be associated with the data flow by being sent to a specific port number. The application can synchronize the data flow and the reliability information, e.g. if the RTP header is included in the message. This alternative is advantageous because in does not require modifications of the socket interface of the receiving terminal.

The above embodiments admirably achieve the objects of the invention. However, it will be appreciated that departures can be made by those skilled in the art without departing from the scope of the invention, which is limited only by the claims.

The invention claimed is:

1. A method for the transmission of data from a transmitter to a receiver, wherein a first protocol in the receiver performs a check whether received data is erroneous and wherein the transmitter performs a further data transmission according to said check, and wherein the first protocol processes the received data and passes a service data unit to the next higher protocol layer, said method comprising the steps of:

determining a reliability measure for the received data;

aggregating the reliability measure for at least a part of the service data unit;

performing a comparison of the aggregated reliability measure to a reliability threshold; and, performing retransmission of said received data, which is detected as erroneous, according to the result of said comparison.

2. The method according to claim 1, wherein the receiver requests the further data transmissions according to the comparison.

3. The method according to claim 1, wherein the reliability measure is determined for a selected part of the received data.

4. The method according to claim 1, wherein at least a further condition determines whether the further data transmission is performed.

5. The method according to claim 4, wherein at least one second reliability threshold is defined and wherein a decision is performed to continue further data transmissions until a selected one of the reliability thresholds is achieved.

6. The method according to claim 1, wherein the receiver sends reliability information indicating an error level of the received data to the transmitter.

7. The method according to claim 2, wherein an optional retransmission request is defined in the first protocol, the receiver sends the optional retransmission request if the reliability measure is at least equal to said reliability threshold, and wherein the transmitter performs a decision as to whether a further data transmission is performed in reply to the optional retransmission request.

8. The method according to claim 1, wherein the transmitter sends a reliability requirement to the receiver and the receiver selects the reliability threshold according to the reliability requirement.

9. The method according to claim 1, wherein the reliability measure is provided to a higher protocol layer or an application and the processing of the higher protocol layer or the application is adapted according to the reliability measure.

10. A receiver for data sent by a transmitter, comprising:

a processing system;

a receiving unit for receiving the data and for forwarding said data to said processing system, wherein the processing system is adapted to perform a check using a first protocol whether received data is erroneous and the first protocol processes the received data and passes a service data unit to a next higher protocol layer; and, a transmission unit adapted to send a request to the transmitter for retransmission of said data according to said check, wherein the processing system comprises a unit for determining a reliability measure for the received data and for aggregating the reliability measure for at least a part of the service data unit, the processing system further comprises a unit for a comparison of the aggregated reliability measure to a reliability threshold, and the processing system is adapted to initiate the request for the further data transmission according to the result of the comparison for data which is detected as erroneous.

11. A transmitter, comprising:

a transmission unit for sending data to a receiver in which a first protocol processes the data and passes a service data unit to a next higher protocol layer;

a receiving unit for receiving requests from the receiver for a retransmission of said data; and, a processing system for storing the sent data and for retrieving the stored data according to the requests and initiating a further data transmission by the transmission unit, wherein the processing system comprises a unit for determining a reliability measure for the data received by the receiver and for aggregating the reliability measure for at least a part of the service data unit, the processing system further comprising a unit for a comparison of the aggregated reliability measure to a reliability threshold, and wherein the processing system is adapted to initiate the further data transmission according to the result of the comparison.

* * * * *